(12) United States Patent
Leedberg et al.

(10) Patent No.: US 8,200,751 B2
(45) Date of Patent: Jun. 12, 2012

(54) SYSTEM AND METHOD FOR MAINTAINING STATEFUL INFORMATION

(75) Inventors: Gregory Leedberg, Milton, MA (US); Kenneth D. Carey, Boston, MA (US)

(73) Assignee: Raytheon Company, Waltham, MA (US)

( * ) Notice: Subject to any disclaimer, the term of this patent is extended or adjusted under 35 U.S.C. 154(b) by 295 days.

(21) Appl. No.: 12/468,099

(22) Filed: May 19, 2009

(65) Prior Publication Data

US 2009/0292760 A1  Nov. 26, 2009

Related U.S. Application Data (60) Provisional application No. 61/128,459, filed on May 20, 2008.

(51) Int. Cl.
*G06F 15/16* (2006.01)
(52) U.S. Cl. ........ 709/203; 709/204; 709/206; 709/207; 709/227; 713/1
(58) Field of Classification Search ................... 709/203
See application file for complete search history.

(56) References Cited

U.S. PATENT DOCUMENTS

| | | | |
|---|---|---|---|
| 5,086,394 A | 2/1992 | Shapira | |
| 5,619,648 A | 4/1997 | Canale et al. | |
| 5,704,017 A | 12/1997 | Heckerman et al. | |
| 6,073,142 A | 6/2000 | Geiger et al. | |
| 6,101,531 A | 8/2000 | Eggleston et al. | |
| 6,157,915 A | 12/2000 | Bhaskaran et al. | |
| 6,330,610 B1 | 12/2001 | Docter et al. | |
| 6,336,134 B1 | 1/2002 | Varma | |
| 6,643,705 B1 | 11/2003 | Wallace et al. | |
| 6,778,941 B1 | 8/2004 | Worrell et al. | |
| 6,832,245 B1 | 12/2004 | Isaacs et al. | |
| 6,886,169 B2 | 4/2005 | Wei | |
| 6,968,179 B1 | 11/2005 | DeVries | |

(Continued)

FOREIGN PATENT DOCUMENTS

EP  1 193 925 A2  4/2002

(Continued)

OTHER PUBLICATIONS

Daniel Guerrier, "Track file downloads?", Jan. 2006, share.ez.no, all pages.*
Notification Concerning Transmittal of International Preliminary Report on Patentability (Chapter 1 of the Patent Cooperation Treaty)/International Preliminary Report on Patentability, PCT/US2009/044451, date of mailing Dec. 2, 2010, 2 pages.

(Continued)

*Primary Examiner* — Hua Fan
(74) *Attorney, Agent, or Firm* — Daly, Crowley, Mofford & Durkee, LLP (57) ABSTRACT

A system for maintaining stateful information includes a client proxy configured to receive and collect status information associated with a client, and a state machine executing on a processor to collect and store the status information in a memory and provide stateful information associated with the client. The client may be a stateless client and the state machine may be configured to maintain stateful information associated with the stateless client. The state machine is may be configured to collect and store information intended for the client and provide the stored information to the client. The system may further include a client status processor configured to process the status information associated with the client and to provide the status information to the client proxy to control the stateful information.

8 Claims, 9 Drawing Sheets

U.S. PATENT DOCUMENTS

| | | | |
|---|---|---|---|
| 7,107,442 B2* | 9/2006 | Cheshire | 713/1 |
| 7,152,111 B2 | 12/2006 | Allred et al. | |
| 7,155,519 B2* | 12/2006 | Lo et al. | 709/227 |
| 7,185,057 B2 | 2/2007 | Brown et al. | |
| 7,249,162 B2 | 7/2007 | Rounthwaite et al. | |
| 7,269,629 B2* | 9/2007 | Zmudzinski et al. | 709/207 |
| 7,299,264 B2 | 11/2007 | Yang-Huffman | |
| 7,343,564 B2 | 3/2008 | Othmer | |
| 7,363,319 B2 | 4/2008 | Cappellini | |
| 7,369,505 B2 | 5/2008 | Mengerink | |
| 7,370,283 B2 | 5/2008 | Othmer | |
| 7,383,307 B2 | 6/2008 | Kirkland et al. | |
| 7,430,724 B2 | 9/2008 | Othmer | |
| 7,437,408 B2 | 10/2008 | Schwartz et al. | |
| 7,441,203 B2 | 10/2008 | Othmer et al. | |
| 7,511,634 B2 | 3/2009 | Stehle et al. | |
| 7,512,569 B2 | 3/2009 | Isaacs | |
| 7,523,137 B2 | 4/2009 | Kass et al. | |
| 7,523,226 B2 | 4/2009 | Anderson et al. | |
| 7,526,573 B2 | 4/2009 | Busey | |
| 7,574,170 B2 | 8/2009 | Jendbro | |
| 7,574,479 B2 | 8/2009 | Morris et al. | |
| 7,581,166 B2 | 8/2009 | Renger et al. | |
| 7,590,691 B2 | 9/2009 | Gonsalves et al. | |
| 7,603,437 B2 | 10/2009 | Busey | |
| 7,752,268 B2* | 7/2010 | Shah | 709/206 |
| 7,811,227 B2* | 10/2010 | Urasaki | 600/118 |
| 2001/0046069 A1 | 11/2001 | Jones | |
| 2002/0083127 A1 | 6/2002 | Agrawal | |
| 2004/0059781 A1* | 3/2004 | Yoakum et al. | 709/204 |
| 2005/0055403 A1 | 3/2005 | Brittan | |
| 2005/0193062 A1 | 9/2005 | Komine et al. | |
| 2005/0234928 A1 | 10/2005 | Shkvarchuk | |
| 2005/0250552 A1 | 11/2005 | Eagle et al. | |
| 2005/0267974 A1 | 12/2005 | Panasyuk et al. | |
| 2006/0073812 A1 | 4/2006 | Venkata | |
| 2006/0133385 A1 | 6/2006 | Trossen et al. | |
| 2006/0173985 A1 | 8/2006 | Moore | |
| 2006/0230021 A1 | 10/2006 | Diab et al. | |
| 2006/0259474 A1 | 11/2006 | Granito | |
| 2006/0265489 A1 | 11/2006 | Moore | |
| 2007/0083536 A1 | 4/2007 | Darnell et al. | |
| 2007/0083894 A1 | 4/2007 | Gonsalves et al. | |
| 2007/0100836 A1 | 5/2007 | Eichstaedt et al. | |
| 2007/0100959 A1 | 5/2007 | Eichstaedt et al. | |
| 2007/0100960 A1 | 5/2007 | Eichstaedt et al. | |
| 2007/0130158 A1 | 6/2007 | LaBiche et al. | |
| 2007/0162432 A1 | 7/2007 | Armstrong et al. | |
| 2007/0162560 A1 | 7/2007 | Jin | |
| 2007/0168461 A1 | 7/2007 | Moore | |
| 2007/0174389 A1 | 7/2007 | Armstrong et al. | |
| 2007/0203977 A1 | 8/2007 | Wu et al. | |
| 2007/0225047 A1 | 9/2007 | Bakos | |
| 2008/0010353 A1 | 1/2008 | Rounthwaite et al. | |
| 2008/0046369 A1 | 2/2008 | Wood | |
| 2008/0059964 A1 | 3/2008 | Khodabakchian et al. | |
| 2008/0104226 A1 | 5/2008 | Seshasai | |
| 2008/0104520 A1 | 5/2008 | Swenson et al. | |
| 2008/0126476 A1 | 5/2008 | Nicholas et al. | |
| 2008/0208972 A1 | 8/2008 | Chou et al. | |
| 2009/0061925 A1 | 3/2009 | Finkelstein et al. | |
| 2009/0070419 A1 | 3/2009 | Gilfix et al. | |
| 2009/0089380 A1 | 4/2009 | Wang et al. | |
| 2009/0172773 A1 | 7/2009 | Moore | |
| 2009/0248729 A1 | 10/2009 | Bruno, Jr. et al. | |

FOREIGN PATENT DOCUMENTS

| | | |
|---|---|---|
| EP | 1 193 925 A3 | 4/2002 |
| EP | 1 883 019 A1 | 1/2008 |
| GB | 2 313 524 A | 11/1997 |
| WO | WO 01/98856 A2 | 12/2001 |
| WO | WO 01/98856 A3 | 12/2001 |
| WO | WO 2004/031976 A1 | 4/2004 |
| WO | WO 2005/083934 A1 | 9/2005 |
| WO | WO 2005/125070 A2 | 12/2005 |
| WO | WO 2005/125070 A3 | 12/2005 |
| WO | WO 2006/088952 A2 | 8/2006 |
| WO | WO 2006/088952 A3 | 8/2006 |
| WO | WO 2007/147207 A1 | 12/2007 |

OTHER PUBLICATIONS

Notification of Transmittal of the International Search Report and the Written Opinion of the International Searching Authority, or the Declaration, PCT/US2009/044451 date of mailing Jun. 10, 2009, 3 pages.

International Search Report, Form PCT/ISA/210, PCT/US2009/044451 date of mailing Oct. 6, 2009, 4 pages.

Written Opinion of the International Searching Authority, PCT/US2009/044451 date of mailing Oct. 6, 2009, 6 pages.

Notification of Transmittal of the International Search Report and the Written Opinion of the International Searching Authority, or the Declaration/International Search Report, PCT/US09/44453, date of mailing Jun. 15, 2010, 3 pages.

Written Opinion of the International Searching Authority, PCT/US09/44453, date of mailing Jun. 15, 2010, 4 pages.

Notification Concerning Transmittal of the International Preliminary Report on Patentability (Chapter 1 of the Patent Cooperation Treaty)/International Preliminary Report on Patentability, PCT/US2009/044453, date of mailing Dec. 2, 2010, 2 pages.

Notification of Transmittal of the International Search Report and the Written Opinion of the International Searching Authority, or the Declaration, PCT/US2009/044454 dated Jul. 30, 2009, 3 pages.

International Search Report, PCT/US2009/044454 dated Jul. 30, 2009, 4 pages.

Written Opinion of the International Searching Authority, PCT/US2009/044454 dated Jul. 30, 2009, 9 pages.

King et al.: "An alternative implementation of the reference monitor concept (military messaging, secure)" Proceedings of the Aerospace Computer Security Applications Conference. Orlando, Dec. 12-16, 1988; Washington, IEEE Comp. Soc.Press, US, Vol. Conf. 4, Dec. 12, 1988, pp. 159-166, XP010014556. ISBN: 978-0-8186-0895-7, p. 160, right-hand column, line 25—line 39; p. 163, left-hand column, line 46—right-hand column, line 37.

U.S. Appl. No. 12/468,100, Gregory Leedberg, et al., filed May 19, 2009, 31 pages.

U.S. Appl. No. 12/468,101, Gregory Leedberg, et al., filed May 19, 2009, 30 pages.

U.S. Appl. No. 12/468,112, Gregory Leedberg, et al., filed May 19, 2009, 33 pages.

U.S. Appl. No. 12/468,116, Kenneth D. Carey, et al., filed May 19, 2009, 41 pages.

"Love: Japanese Style", Yukari Iwatani, Wired Magazine Online, Jun. 11, 1998, 2 pages, http://www.wired.com/culture/lifestyle/news/1998/06/12899, last accessed Jan. 13, 2011.

"Social Serendipity", MIT Media Lab: Reality Mining, Mar. 9, 2009, 10 pages, http://reality.media.mit.edu/serendipity.php, last accessed Jan. 13, 2011.

Notification of Transmittal of the International Search Report and the Written Opinion of the International Searching Authority, or the Declaration, PCT/US2009/044452, dated Aug. 12, 2009, 3 pages.

International Search Report, PCT/US2009/044452, dated Aug. 12, 2009, 4 pages.

Written Opinion of the International Searching Authority, PCT/US2009/044452, dated Aug. 12, 2009, 6 pages.

Notification Concerning Transmittal of International Preliminary Report on Patentability (Chapter 1 of the Patent Cooperation Treaty), PCT/US2009/044454, date of mailing Dec. 2, 2010, 2 pages.

Notification of Transmittal of the International Search Report and the Written Opinion of the International Searching Authority, or the Declaration, PCT/US2009/044450 dated Oct. 6, 2009, 3 pages.

International Search Report Form PCT/ISA/210, PCT/US2009/044450 dated Oct. 6, 2009, 4 pages.

Written Opinion of the International Searching Authority, PCT/US2009/044450 dated Oct. 6, 2009, 5 pages.

Brok J. et al: "Enabling New Services by Exploiting Presence and Context Information in IMS", Bell Labs Technical Journal, Wiley, CA, US, vol. 4, No. 10, Jan. 1, 2006, pp. 83-100, XP001239288, ISSN: 1089-7089.

3GPP: "3rd Generation Partnership Project; Technical Specification Group Services and System Aspects; Presence Service; Architecture and functional description (release 6)", 3GPP TS 23.141 v. 6.1.0, (Dec. 2002) Technical Specification; 3rd Generation Partnership Project (3GPP), Mobile Competence Centre; 650, Route Des Lucioles; F-06921 Sophia-Antipolis Cedex; France, vol. SA WG5, no. Sophia Antipolis, France; 20030120, Jan. 10, 2003, XP050295829, pp. 1-31.

Notification Concerning Transmittal of International Preliminary Report on Patentability (Chapter 1 of the Patent Cooperation Treaty), PCT/US2009/044450, date of mailing Dec. 2, 2010, 2 pages.
Written Opinion of the International Searching Authority, PCT/US2009/044450, date of mailing Dec. 2, 2010, 5 pages.
European Patent Application No. 09751332.9-1243 Response to Office Action as filed on Mar. 10, 2011.

* cited by examiner

SYSTEM AND METHOD FOR MAINTAINING STATEFUL INFORMATION

RELATED APPLICATIONS

This application claims the benefit of U.S. Provisional Application No. 61/128,459 filed May 20, 2008 under 35 U.S.C. §119(e) which application is hereby incorporated herein by reference in its entirety.

BACKGROUND

As is known in the art, many application services require clients to maintain a constant connection in order to function properly. For example, the eXtensible Messaging and Presence Protocol (XMPP), which is a set of open eXtensible Markup Language (XML) technologies for presence and real-time communication, requires persistent client connections to support instant messaging and presence information. However, some clients are unable to maintain constant connectivity for a variety of reasons.

Mobile clients operated in harsh environments may require and/or experience periodic transmission silence and may be plagued by unreliable network connectivity. Web clients issue stateless requests to web servers without maintaining persistent connections. Application services, therefore, cannot rely upon these clients to maintain a constant connection.

SUMMARY

In general overview, one may appreciate that the inventive concepts include systems and methods for maintaining stateful information for clients operating in environments in which a constant connection cannot be relied upon and/or maintained. In one embodiment, a client proxy collects status information for a client. The status information includes, but is not limited to, state information such as whether the client is online and/or unavailable because of interruptions in network service. The status information can further include client attributes, such as a client name and/or a unique client identifier to enable client identification.

In this embodiment, the client proxy provides the status information to a state machine. The state machine maintains stateful information for the client and provides the stateful information to external services, which may include other clients. In this way, the state machine acts on behalf of the client to provide consistent state information to external services and/or other clients.

The stateful information maintained for the client depends upon the needs and/or desires of the operating environment. In an exemplary operating environment involving wireless clients, the state machine maintains stateful information on behalf of clients that experience interruptions in network service. For example, mobile clients may lose wireless service while traveling through tunnels and/or may be temporarily disabled, as may be the case during airplane takeoff and landing.

During such times, the state machine acts as a surrogate for the client. In a further embodiment, this includes collecting information from external services intended for the client until the client is back online. Such information may include, but is not limited, text messages from other clients that are intended for the client or updates such as positional updates for one or more fleet vehicles provided to the client as part of a fleet tracking application.

In another exemplary operating environment, the state machine maintains stateful information for stateless clients. Such stateless clients include, but are not limited to, web clients which do not maintain state information from one server request to another service request. Here, the state machine may keep track of web content mostly recently downloaded to the client. For example, the state machine may provide that a first web user and a second web user have recently downloaded a video on a military helicopter crash. These users can be made aware of each other so that they can discuss this topic and/or collaborate and/or share information about the topic. Such behavior is perhaps a web-based version of the office water cooler at which people meet and congregate to learn about and discuss various issues, topics, and shared interests and tasks.

In still a further embodiment, clients may remotely control a state machine. Here, the client may send client status updates to the state machine to control its own state. This may be particularly useful and more efficient when the client is better-suited for recognizing changes in its operating state. Still further, users may provide information to the state machine related to topics of interest, problems and/or a task at hand. For example, a web client can recognize that a user is viewing certain web content. The client can send such information to the state machine, which maintains that the client is viewing the web content.

In one aspect, the inventive concepts described herein include a system for maintaining stateful information including a client proxy configured to receive and collect status information associated with a client, and a state machine executing on a processor to collect and store the status information in a memory and provide stateful information associated with the client. In a further embodiment, the system includes a plurality of client proxies, each associated with a different client.

In further embodiments, the system includes one or more of the following features: the stateful information includes a unique client identifier, and a client status; the stateful information further includes a client activity; the client is a stateless client and the state machine is further configured to maintain stateful information associated with the stateless client; the state machine is further configured to collect and store information intended for the client and provide the stored information to the client; status information is controlled by the client, and; a client status processor configured to process the status information associated with the client and to provide the status information to the client proxy to control the stateful information.

In another aspect, the inventive concepts include a method for maintaining stateful information including, in a client proxy, receiving and collecting the status information associated with a client and in a state machine executing on a processor, processing the status information and providing stateful information associated with the client, collecting messages intended for the client, and distributing the messages intended for the client.

In further embodiments, the method includes one or more of the following features: the stateful information includes a unique client identifier and a client status; the stateful information further comprises a client activity; distributing the messages intended for the client in response to a request from the client, and; distributing the messages intended for the client over a reacquired client connection; the client is a stateless client and further including remote controlling of the stateful information by the client over a network.

In another aspect, an article includes a storage medium having stored instructions thereon that when executed by a machine result in the following: receiving and collecting the status information associated with a client, and processing the status information to provide stateful information associated with the client.

In further embodiments, the article includes one or more of the following features: the stateful information includes a unique client identifier and a client status; the stateful information further comprises a client activity; the client is a stateless client and further including maintaining stateful information associated with the stateless client; further including collecting and storing information intended for the client and providing the stored information to the client; further including processing status information associated with the client and providing the status information, and; further including controlling the stateful information over a network.

BRIEF DESCRIPTION OF THE DRAWINGS

The foregoing features of this invention, as well as the invention itself, may be more fully understood from the following description of the drawings in which.

DETAILED DESCRIPTION

Figure 1:
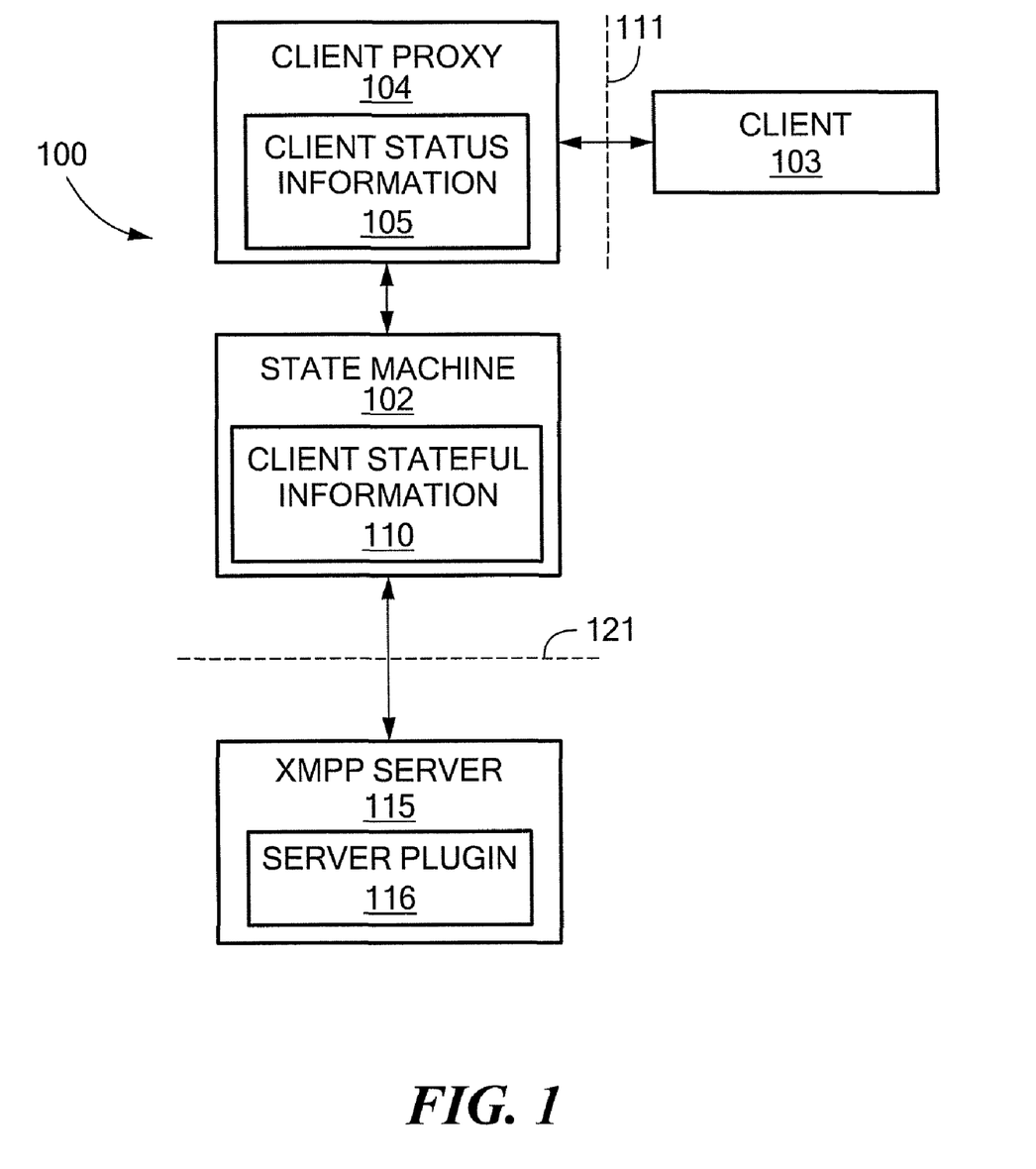
FIG. 1 is a block diagram of an embodiment of a system for maintaining stateful information for a client.

Referring to FIG. 1, a system 100 for maintaining stateful information 110 includes a client proxy 104 configured to receive and collect status information 105 associated with a client 103, and state machine 102 executing on a processor to collect and store the status information 105 in a memory and provide the stateful information 110 associated with the client 103.

In one embodiment, the client proxy 104 receives the status information 105 over a network 111, which may include, but is not limited to, the Internet or an intranet. Still further, the network 111 may at least partially include a wireless network, such as a wireless network to enable cellular phone usage and/or Bluetooth® devices. The network may include a wireless and a wired portion, such as a network enabling wireless device usage as well as wired device usage, such as telephones.

In one embodiment, the client proxy 104 receives client status information 105 in response to a request for the information. For example, the client proxy 104 may request the status information 105 using the hypertext transfer protocol (HTTP). In the same or different embodiment, the client 103 responds to the request by sending the status information 105. The client 103 may be configured outside of the system 100 to respond to client proxy 104 requests with certain types of information, such as web browser activity as will be described below.

In still other embodiments, the client 103 sends the status information 105 to the client proxy 104 at regular intervals or when the status information 105 changes. For example, the client 103 may regain wireless service and send a message in the form of a HTTP POST to the client proxy 104 indicating that the client 103 is back online.

In some instances, the client proxy 104 may not receive a response from the client 103, for example, within a certain timeframe, such as one second, thirty seconds, one minute, five minutes, etc. Here, the client proxy 104 may provide default status information 105. For example, the client proxy 104 may determine that a client 103 is offline when no response is received from the client 103 within one minute.

The status information 105 includes, but is not limited to, whether the client 103 is online or offline. For example, in one embodiment, the client 103 is engaged in a chat session that allows a chat user to indicate whether she is online (i.e. actively engaged in the chat session) or offline, for example, because the chat user is away from her computer. In still other embodiments, the client 103 is a mobile device that experiences interruptions in service. Such a mobile device can be said to go offline when service is unavailable. For example, a mobile device may go offline when a wireless network is overloaded with service requests from multiple devices. This can occur in crowded urban centers, such as on commuter rail trains during rush hour when multiple cell phone users attempt to make calls. In another example, a mobile client goes offline when structures block wireless signals. For example, a mobile client in a vehicle may go offline when the vehicle enters a tunnel and the wireless signal is blocked by intervening objects.

The status information 105 may include an action performed the client 103. For example, the client 103 may be a web client and the action performed may be downloading a web page and/or video. Still further, the status information 105 may include more detailed action information, such as requesting a web page for viewing, obtaining the web page (i.e. the web page contents have been successfully download to the client 103), and/or streaming a portion of a video to the client 103.

In one embodiment, an external service includes an XMPP server 115 communicating with the state machine 102 over a network 121. The XMPP server 115 includes a server plug-in 116 that may be used to customize server functionality. The XMPP server 115 requires a constant connection with the client 103. The state machine 102 provides and maintains the constant connection to the client 103 for the XMPP server 115, even when the client 103 goes offline, for example, because of wireless signal interruptions.

In the same or different embodiment, the state machine 102 receives one or more updates from the XMPP server 115 intended for an offline client. The state machine 102 maintains the client connection on behalf of the client 103 and collects the updates from the XMPP server 115. The state machine 102 waits until the client 103 is back online to process and/or send the updates to the client 103.

The state machine 102 may use the status information 105 to identify one or more client activities. For example, the client 103 may be a web client viewing information on a web site. For example, the web client may be viewing one or more web pages and/or videos downloaded from the web site. In one embodiment, the status information 105 indicates that a web client has finished downloading a first web page. Here, the state machine 102 identifies that the web client is currently viewing the first web page. The state machine 102 maintains this as the client activity until, for example, the status information 105 indicates that the web client has finished downloading a second web page, in which case the client activity is updated to identify that the client is viewing the second web page.

Such client activities can distinguish various interests of a client user. For example, a client user who searches for a particular consumer good on a search engine web site can be said to be interested in purchasing the good. Still further, a client user who requests web content on how to fix a leaky pipe can be said to be interested in fixing a leaky a pipe. In another example, a client user who downloads one or more videos regarding a medical procedure can be said to be interested in that medical procedure, perhaps because they must perform it on a patient. Such interest-oriented information may be used to place users with similar interests, needs, and/or desires in contact with each other to collaborate and share information.

Figure 2:
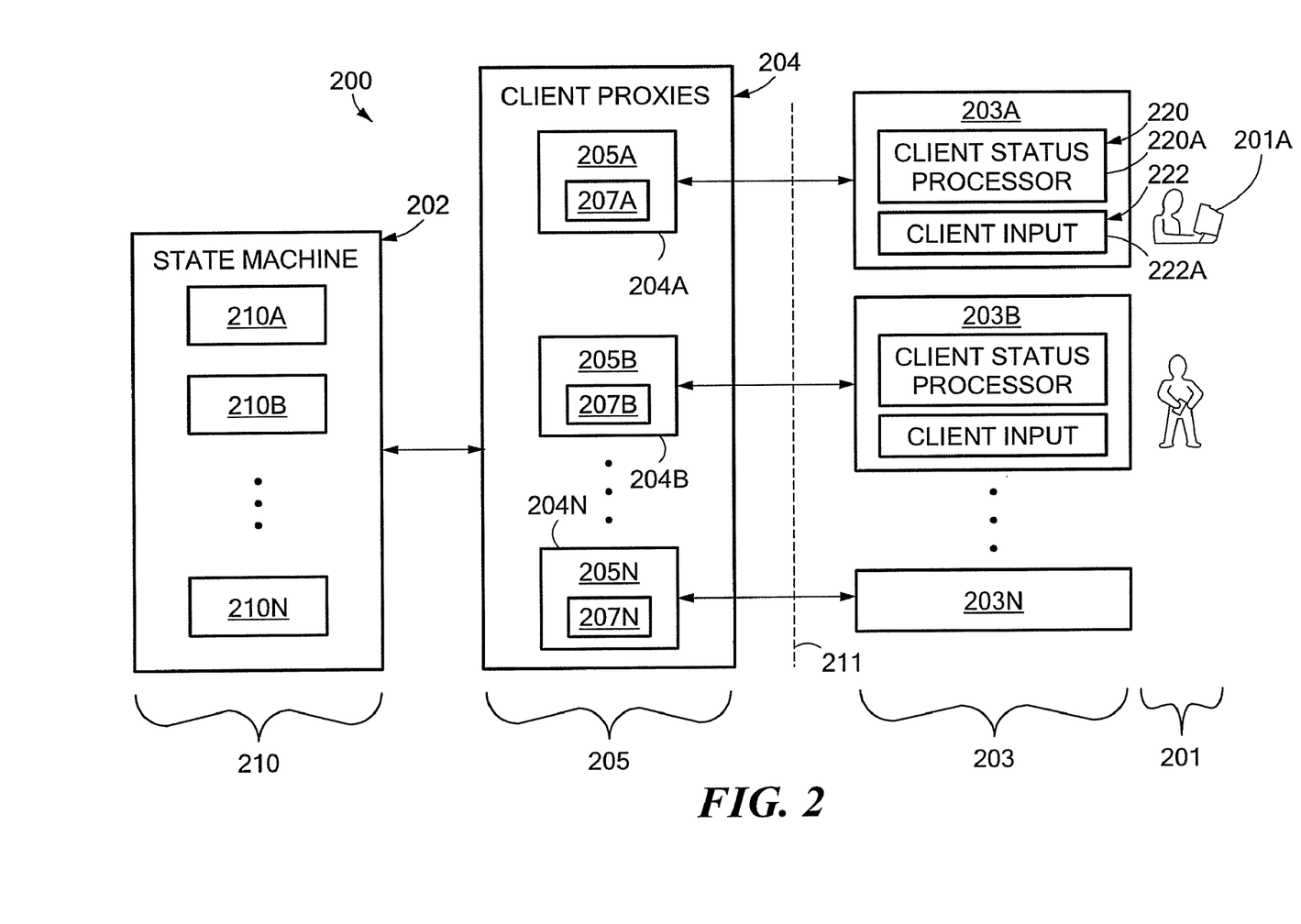
FIG. 2 is another embodiment of a system for maintaining stateful information for a client.

Referring now to FIG. 2, in a further embodiment of the inventive concepts, a system 200 for maintaining stateful information 210 includes client proxies 204 configured to receive and collect status information 205 associated with clients 203, and a state machine 202 to collect and store the status information 205 to provide the stateful information 210 associated with the clients 203. Each of the client proxies 204 is associated with a different client 203. For example, client proxy 204A is associated with client 203A, client proxy 204B is associated with client 204B, and client proxy 204N is associated with client 204N.

As illustrated in FIG. 2, the system 200 can maintain stateful information 210 for any number of clients 203, for example two clients, five clients, ten client, one hundred clients, one thousand clients, etc. Each client 203A, 203B-203N is associated with a respective client proxy 204A, 204B-204N to receive respective client status information 205A, 205B-205N. Further, for each of the clients 203A, 203B-203N, the state machine 202 maintains respective stateful information 210A, 210B-210N.

In one embodiment, client status information 205 includes a unique client identifier 207 associated with a client 203. The unique client identifier 207 cross-references status information 205 and stateful information 210 for a client 203, as well as identifies a client proxy 204 associated with a client 203. For example, unique client identifier 207A cross-references stateful information 210A and status information 205A with client 203A, as well as client proxy 204A with client 203A. The unique client identifier 207 can include, but is not limited to, a primary key value of a database or a network card identification number. For example, a network capable client device may include a network interface controller (NIC). The NIC has a read-only memory chip that has a unique Multiple Access Control (MAC) address burned or engraved into it, which may serve as the unique client identifier 207.

In one embodiment, a client 203 is a stateless client. Here, the state machine 202 is configured to maintain stateful information 210 associated with the stateless client. A stateless client may include a client that communicates with a server asynchronously. Here, the inventive concepts may be used to maintain stateful information for a client from, for example, one asynchronous request to another. Such stateless clients include web clients that interact with web servers asynchronously. For example, the state machine 202 can recognize that a web client user has downloaded a web page "ABC.htm" and can maintain a state of the web client as "currently viewing web page ABC.htm." This state can be maintained until the state machine recognizes that the web client user has downloaded another web page "DEF.htm," at which time the state can be updated and maintained as "currently viewing web page DEF.htm."

In a further embodiment of the system 200, the client 203 provides the client status information 205 to control the stateful information 210. For example, the client 203 can push client status information 205 to the client proxy 204. In still a further embodiment, a client status processor 220 processes client status information on the client 203 and provides it to the client proxy 204. Advantageously, the client status processor 220 can provide client status information updates based on particular events experienced on the client 203. For example, on a mobile device the client status processor 220 can recognize when a client 203 regains wireless service after a temporary interruption to the service. The client status processor 220 can send an update to the client proxy 204 indicating that the client 203 is back online. In another example, the client status processor 220 can recognize when web content has been downloaded to the client 203 and can send an update to the client proxy 204 that the web content has been received and the client user is viewing it.

Once client status information updates have been received by the client proxy 204, the client status information can be provided to the state machine 202 which may then update the stateful information for the client 203. Advantageously, such a system 200 enables a client 203 to remotely control the state machine 202.

In still a further environment, a client user 201 can input 222 the client status information to be provided to the client proxy 204. For example, a client user 201A on client 203A can provide input 222A to send to client proxy 204A. Such input 222A may be processed by client status processor 220A in order to provide the input in a format accepted by the client proxy 204A. For example, the input 222A may be provided as an XML file.

Figure 3:
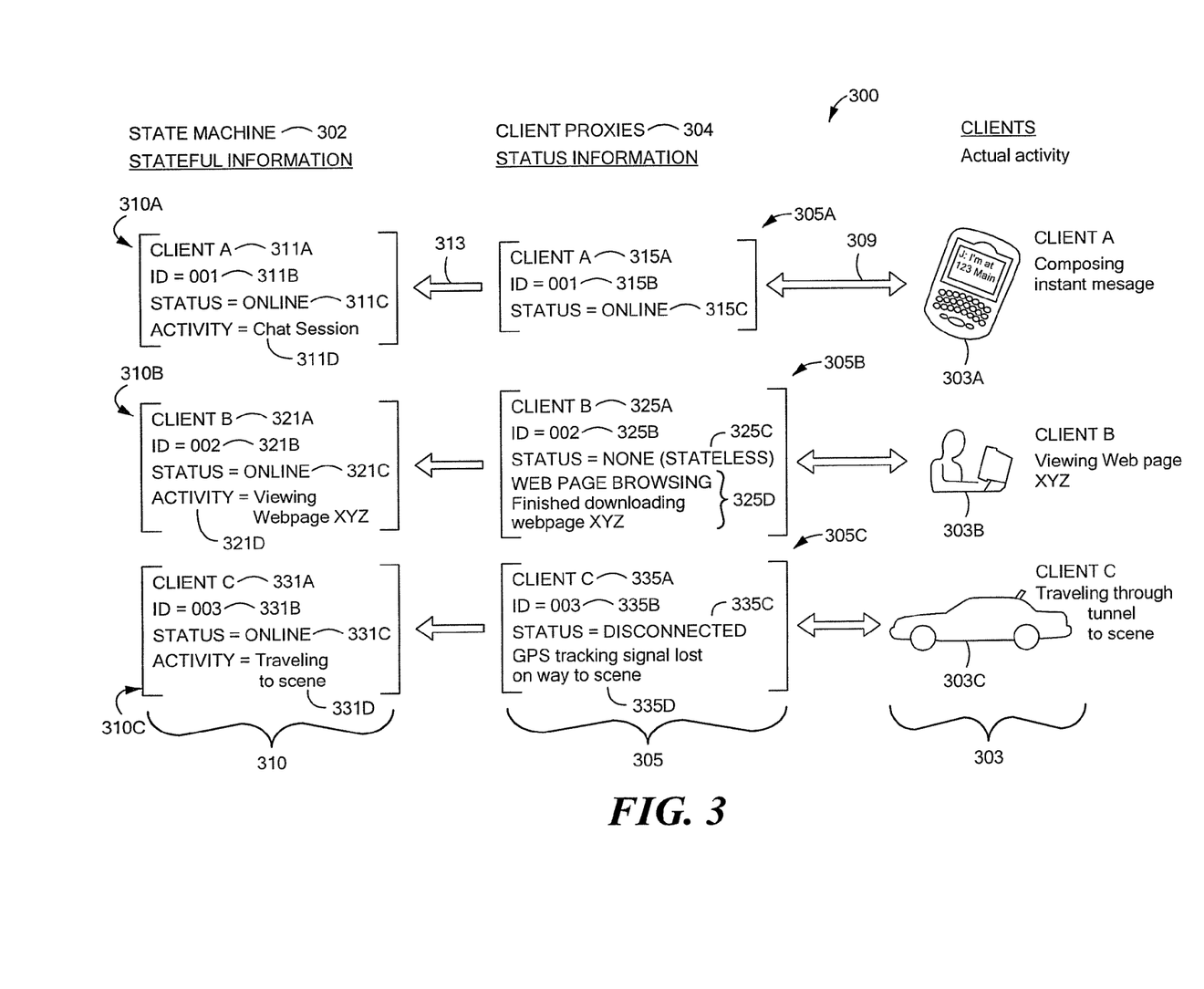
FIG. 3 is an embodiment of client status information and client stateful information for clients.

Referring now to FIG. 3, a system 300 for maintaining stateful information for clients 303 includes client status information 305 collected by client proxies 304 and client stateful information 310 maintained by a state machine 302. A first client 303A is a chat client engaged in a chat session using a hand-held wireless device (hereinafter referred to as CLIENT A), a second client 303B is a web client viewing a web page (hereinafter referred to as CLIENT B), and a third client 303C is tracked using a geographic positioning system (GPS) in a vehicle (hereinafter referred to as CLIENT C).

CLIENT A is currently composing an instant message to be sent via a chat server to other clients engaged in the chat session. In one embodiment, the chat server is an XMPP server for sending and receiving text message among users. A client proxy receives client status information 305A for CLIENT A, which may include the name of the client 315A, a unique client identifier 315B, and an active status 315C. In one embodiment, the active status 315C is one of ONLINE or OFFLINE to recognize whether the client 303A is actively engaged in the chat session or not engaged, for example, because the client is attending to other tasks. Here, CLIENT A's active status 315C is ONLINE indicating that CLIENT A is currently engaged in the chat session. In still another embodiment, an active status may also include whether a client is unavailable because of service interruptions, for example, due to an overloaded network and/or loss of signal from obstructing objects.

Bi-directional arrow designated by reference numeral 309 depicts that the client status information 305A may either be received by the client proxy in response to a client proxy request for the information, or sent by the client 303A to the client proxy 304, for example, based on events experienced on the client 303A. Such events may include the chat user modifying her chat session active status to OFFLINE while attending to other tasks.

The client proxy provides the client status information 305A to the state machine 302 (as denoted by arrow designated by reference numeral 313), which maintains stateful information 310A for CLIENT A. The stateful information 310A may include the name of the client 311A, a unique client identifier 311B, an active status 311C, and a current client activity 311D. Here, the client activity 311D is "Chat Session", which recognizes that CLIENT A is currently engaged in the chat session.

CLIENT B is currently viewing web page "XYZ." For example, CLIENT B may be viewing the web page in a web browser after receiving the web page from a web server in response to a request for the web page. The client proxy includes state information 305B, such as the name of the client 325A, a unique client identifier 325B, a status 325C, and a client status update 325D. In one embodiment, CLIENT B is a stateless client, in which case the status 325C is NONE. Such may be used for recognizing stateless clients.

The client status update 325D provides information related to a current activity or set of related events. For example, the events may include related transactions. In the same or different embodiment, the client status update 325D is related to completion of content requests over the web. For example, the client status update 325D may recognize that CLIENT B has finished downloading web page XYZ.

Client proxy provides the client status information 305B to the state machine 302, which maintains stateful information 310B for CLIENT B. The stateful information 310B may include the name of the client 321A, a unique client identifier 321B, a status 321C, and a client activity 321D. Here, the status is ONLINE, which provides a persistent presence for CLIENT B despite the fact that CLIENT B is a stateless client. This may important for external services that require a constant connection to clients, such as an XMPP server. The client activity 321D is used to maintain activity details regarding CLIENT B. Here, the state machine 302 maintains and identifies CLIENT B's activity as viewing web page XYZ. Such information may be provided to external services, which may use it to foster collaboration among users.

CLIENT C is currently traveling through a tunnel to a scene, such as the scene of an event. The client proxy may include status information 305C such as the client name 335A, a unique client identifier 335B, a status 335C, and a client status update 335D. Here, the status 335C is DISCONNECTED because the GPS tracking signal has been lost, for example, because the vehicle is traveling through a tunnel. The client status update 335D indicates details about the status, such as that the GPS tracking signal was lost on the way to the scene.

As with CLIENT A and CLIENT B, the client proxy provides the client status information 305C to the state machine 302, which maintains stateful information 310C for CLIENT C. The stateful information 310C may include the client name 331A, a unique client identifier 331B, a status 331C, and a client activity 331D. Here, state machine 302 maintains CLIENT C's status as ONLINE, despite that fact that CLIENT C is disconnected because the GPS tracking signal has been lost in the tunnel. Still further, the state machine 302 maintains CLIENT C as traveling to the scene.

Figure 4A:
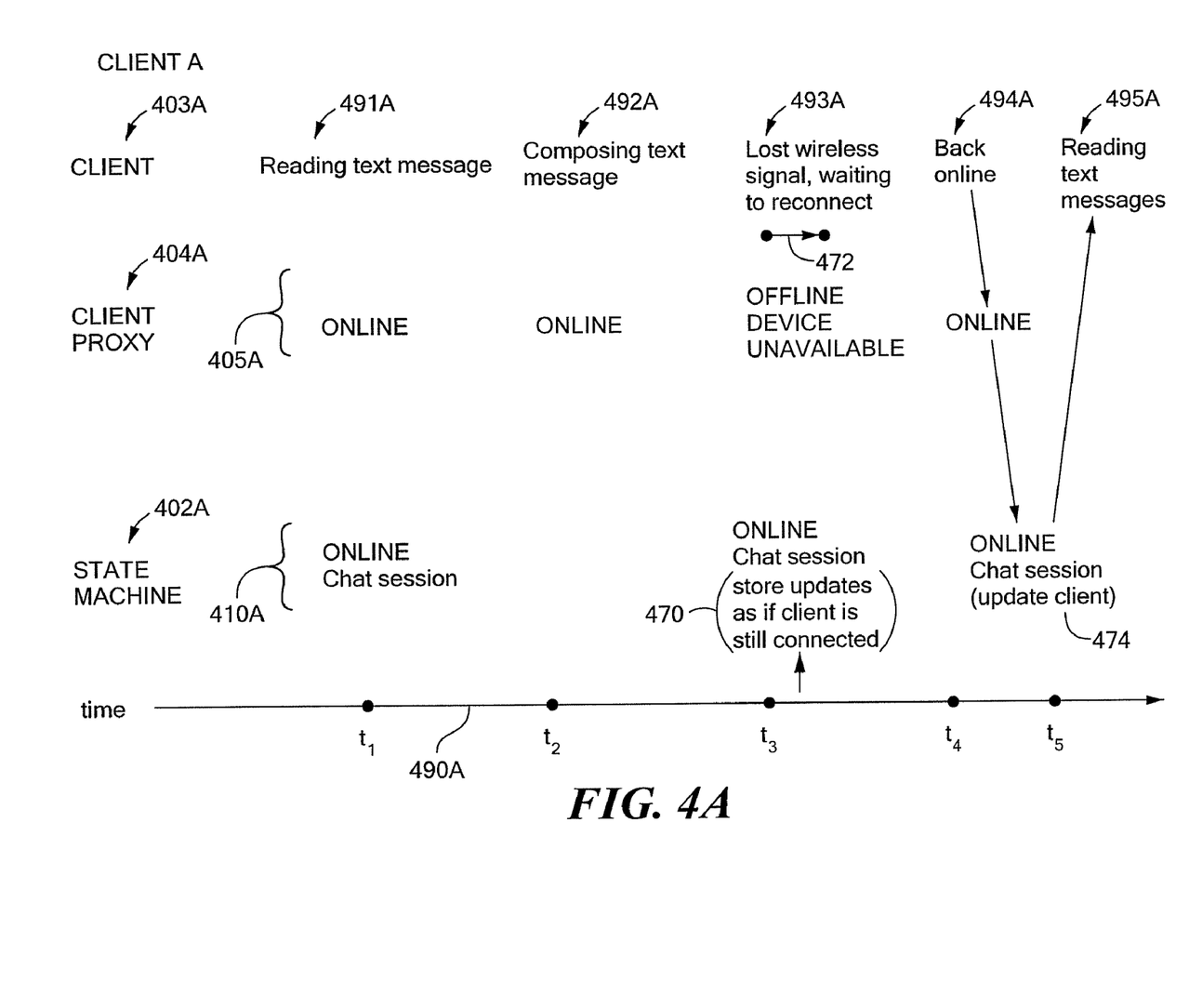
FIG. 4A is timeline of an exemplary operation of an embodiment of a system for maintaining stateful information for a client in a chat session.

Referring now to FIG. 4A, a timeline 490A illustrates client status information and stateful information for a client 403A at various times during the operation of a further embodiment of the system of FIG. 1. At time t1, the client 403A (hereinafter referred to as CLIENT A) is reading a text message (491A) in a chat session. A client proxy 404A provides client status information 405A, including information that CLIENT A is ONLINE, to state machine 402A. The state machine 402A maintains CLIENT A's stateful information 410A, including information that CLIENT A is ONLINE and participating in a chat session.

At time t2, CLIENT A is composing a text message (492A). The status information 405A and stateful information 410A has not changed. However, at time t3 the client device loses the wireless signal and waits to reconnect to the chat session 493A. The client status information 405A changes to indicate that CLIENT A is OFFLINE and no longer available. There may be a time lag 472 between the time that CLIENT A loses the connection and the time that the client proxy 404A recognizes that CLIENT A has lost the connection. Such changed status information may not be identified, therefore, until the client proxy 404A recognizes that CLIENT A has failed to respond to requests for status information and/or CLIENT A has stopped sending client status information to the client proxy 404A.

State machine 402A maintains the stateful information 410A for CLIENT A as ONLINE and participating in the chat session, despite that fact that CLIENT A is unavailable and is temporarily absent from the chat session. The state machine 402A acts on behalf of CLIENT A, which may include storing updates intended for CLIENT A (470). In one embodiment, such updates include text messages intended for CLIENT A sent by a chat server, such as an XMPP server.

At time t4, CLIENT A is back online (494A), and client status information 405A changes back to ONLINE. Such information may be provided by CLIENT A or it may be received in response to a request from the client proxy 404A. In the former, a client status processor, as may be similar to client status processor 220 described in conjunction with FIG. 2, may send the status update immediately after CLIENT A is able to reacquire the signal. This may be more responsive than the client proxy 404A repeatedly issuing requests to CLIENT A, depending on the amount of time between requests.

The client proxy 404A provides the updated status information 405A to the state machine 402A, which recognizes that CLIENT A is back online and provides the stored updates to CLIENT A (474). In one embodiment, such updates are the stored text messages sent by the chat server described above. At time t4, CLIENT A reads the received updates (495A). It should noted that during the time that CLIENT A is offline, CLIENT A will not be responding to text messages from other users, despite the fact that the XMPP server may continue to indicate to the other users that CLIENT A is online. In such a case, the state machine 402A may include additional stateful information that CLIENT A is not connected, which may be provided to the XMPP server and output to the other users. In this way, the other users can be made aware of CLIENT A's status (and understand why CLIENT A is no longer responding to messages and hold off on sending messages to CLIENT A) while still allowing the XMPP server to behave as if CLIENT A was still connected.

Figure 4B:
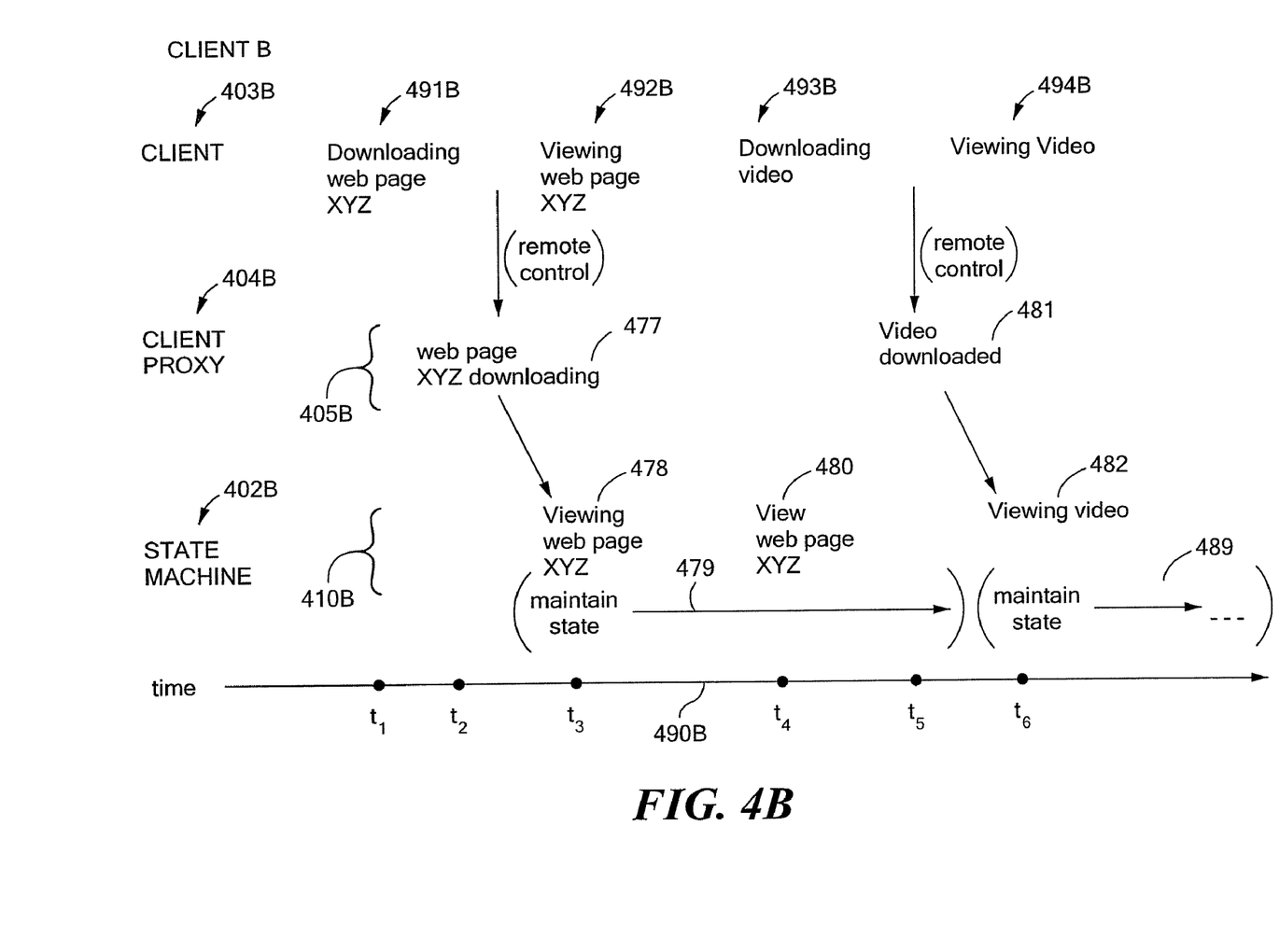
FIG. 4B is timeline of an exemplary operation of an embodiment of a system for maintaining stateful information for a client on the web.

Referring now to FIG. 4B, a timeline 490B illustrates client status information and stateful information for a client 403B at various times during the operation of a further embodiment of the system of FIG. 1. At time t1, the client 403B (hereinafter referred to as CLIENT B) is downloading web page XYZ.htm (491B). At time t2, the client status information 405B indicates that CLIENT B has finished downloading the web page (477).

At time t3, CLIENT B is viewing the web page (492B). The client proxy 404B provides the download status information to the state machine 402B, which maintains CLIENT B's state as viewing web page XYZ (478). State machine 402B maintains this state information (479), for example, from time t3 to time t5 when CLIENT B has finished downloading other web content.

Such download status information may be provided by CLIENT B. For example, a client status processor, as may be similar to client status processor 220 described in conjunction with FIG. 2, may send the information to client proxy 404B, which provides the information to the state machine 402A. Still further, a client user may input this information. For example, the client user may indicate that she is viewing information related to a topic on the web page and submit (or the client status processor may automatically send) the information to the client proxy 404B.

It can be said that CLIENT B, through the above described operations (i.e. indicating to the state machine 402B via the client proxy 404B that it has finished downloading web content), is remote controlling the state machine 402B. This may useful in scenarios where a client desires and/or needs to provide status information to external services. For example, a client can indicate that they are traveling to a scene of an accident. Still further, a client can inform the external service about web content viewed on the client so that the external service can place the client into contact with any other clients who have also viewed or are viewing the web content.

At time t4, CLIENT B now decides to download a video (493B). The state machine 402B still indicates that CLIENT B is viewing the web page 480. At time 5, client proxy 404B recognizes that CLIENT B has finished downloading the video 481 and provides the updated status information to the state machine 402B, which changes the state to viewing video 482. At time t6, CLIENT B is viewing the video (494B) and the state machine 402B maintains this state information 489.

Figure 4C:
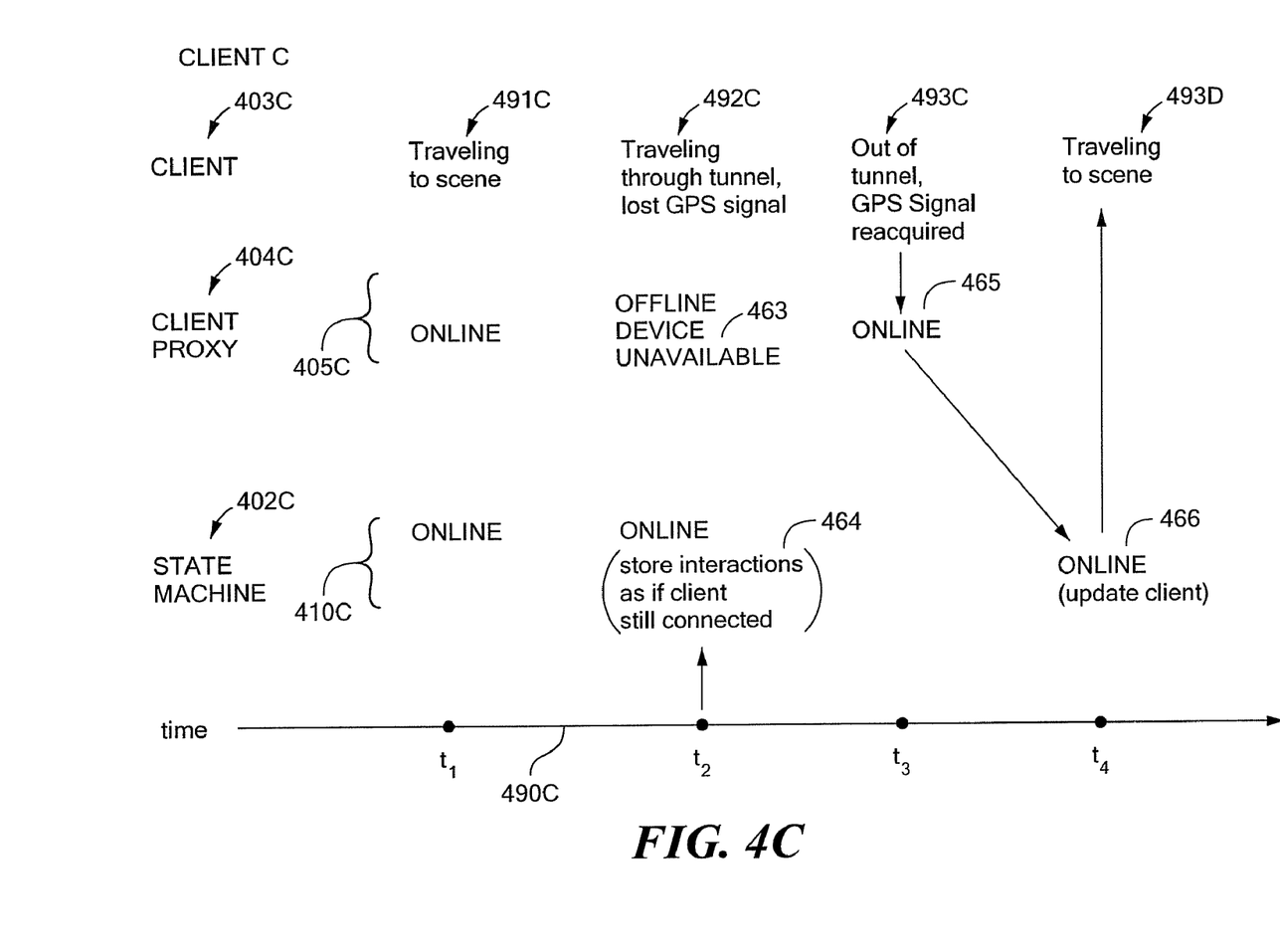
FIG. 4C is timeline of an exemplary operation of an embodiment of a system for maintaining stateful information for a client in a tracking system.

Referring now to FIG. 4C, a timeline 490C illustrates client status information and stateful information for a client 403C at various times during the operation of a further embodiment of the system of FIG. 1. At time t1, the client 403C (hereinafter referred to as CLIENT C) is traveling to a scene (491C). CLIENT C includes a GPS tracking device for providing location information to an external service. At time t1, CLIENT C is online. At time t2, the GPS tracking signal is lost as CLIENT C travels through a tunnel (492C). Client proxy 404C provides status information 405A that CLIENT C is OFFLINE and is unavailable 463. State machine 402C maintains CLIENT C's states as ONLINE 464. In one embodiment, the state machine 402C store interactions with CLIENT C from external services as if CLIENT C were still connected to the external services. For example, the interactions may include map updates from a location server, such as updated fleet vehicle positions. At time t3, the GPS tracking signal is reacquired as CLIENT C travels out of the tunnel (493C). The client proxy 404C provides status information 405C that CLIENT C is back online and the state machine 402C provides the stored interactions to CLIENT C 466. At time t4, CLIENT C is traveling to the scene and receives the interactions (493D).

Figure 5:
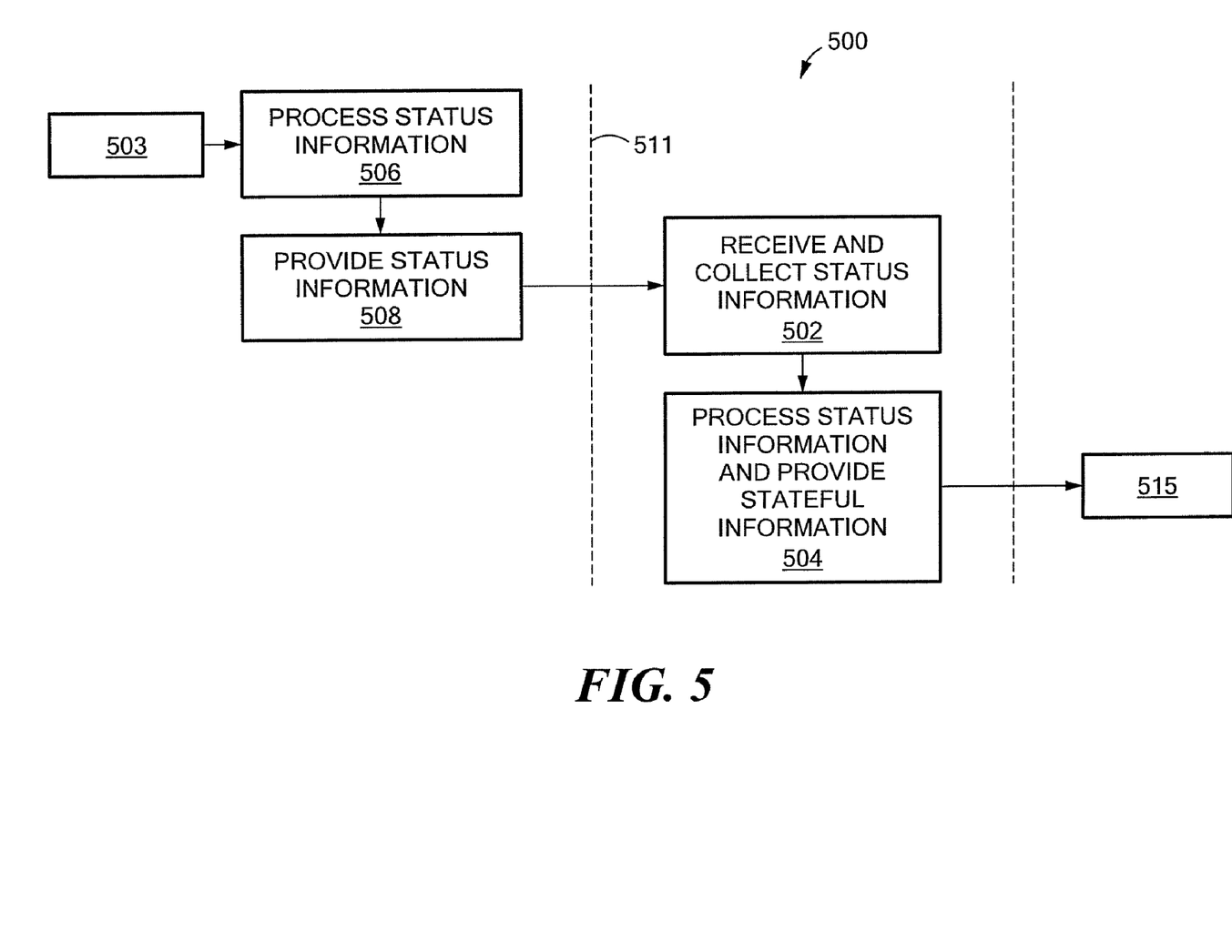
FIG. 5 is a flow diagram of an embodiment of a method for maintaining stateful information for a client.

Referring now to FIG. 5, a method 500 for maintaining stateful information includes, in a client proxy, as may be similar to client proxy 104 described in conjunction with FIG. 1, receiving and collecting client status information for a client 503 (step 502) and, in a state machine, as may be similar to state machine 102 described in conjunction with FIG. 1, processing the status information to maintain and provide stateful information for the client 503 (step 504). The stateful information may be provided to external applications and other clients 515. In a further embodiment, the method 500 includes processing status information on the client 503 (step 506) and as well as the client 503 providing the status information to the client proxy (step 508).

The client status information may be received by the client proxy in response to a client proxy request over network 511 to the client 503 for the client status information. Such a request may be in the form of an HTTP request. Alternatively, the client 503 sends the client status information to the client proxy in the form of an HTTP request, which may be at regular intervals and/or may be event-driven.

Figure 6:
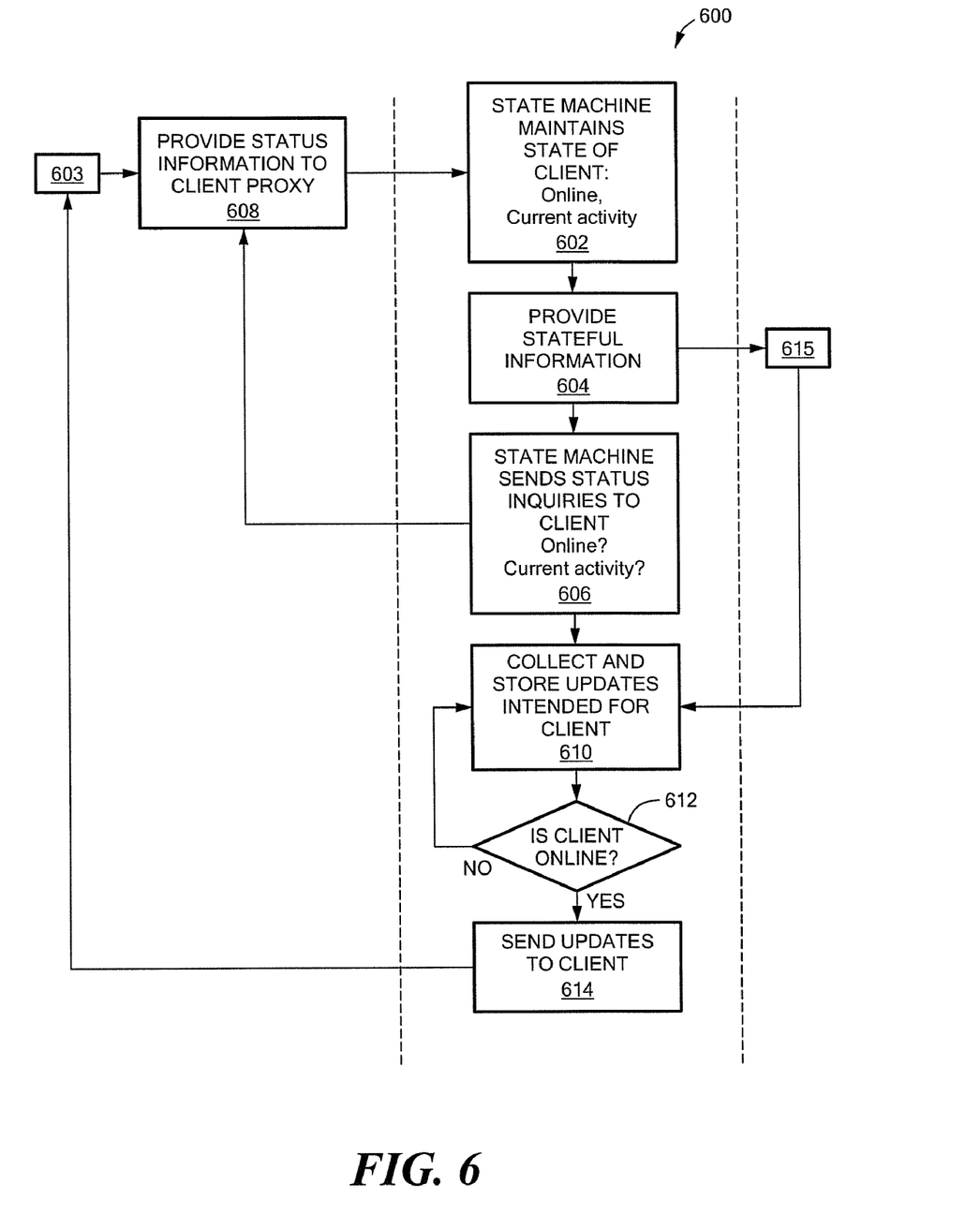
FIG. 6 is a flow diagram of a more detailed embodiment of the method of FIG. 5.

Referring now to FIG. 6, in a further embodiment 600 of the method of FIG. 5, the state machine maintains a state of a client 603, including whether the client 603 is online and/or a current client activity (step 602). The state information is provided to external applications and/or other clients 615 (step 604). In this embodiment, the state machine sends client status inquiries to the client 603 (step 606). For example, the state machine may inquire whether the client 603 is online and/or the client's 603 current activity. In response, the client 603 provides client status information to a client proxy (step 608). In a further embodiment, the state machine collects and stores updates from external services 615 intended for the client 603 (step 610). If the client is online (612), the updates are sent to the client 603 (step 614).

Figure 7:
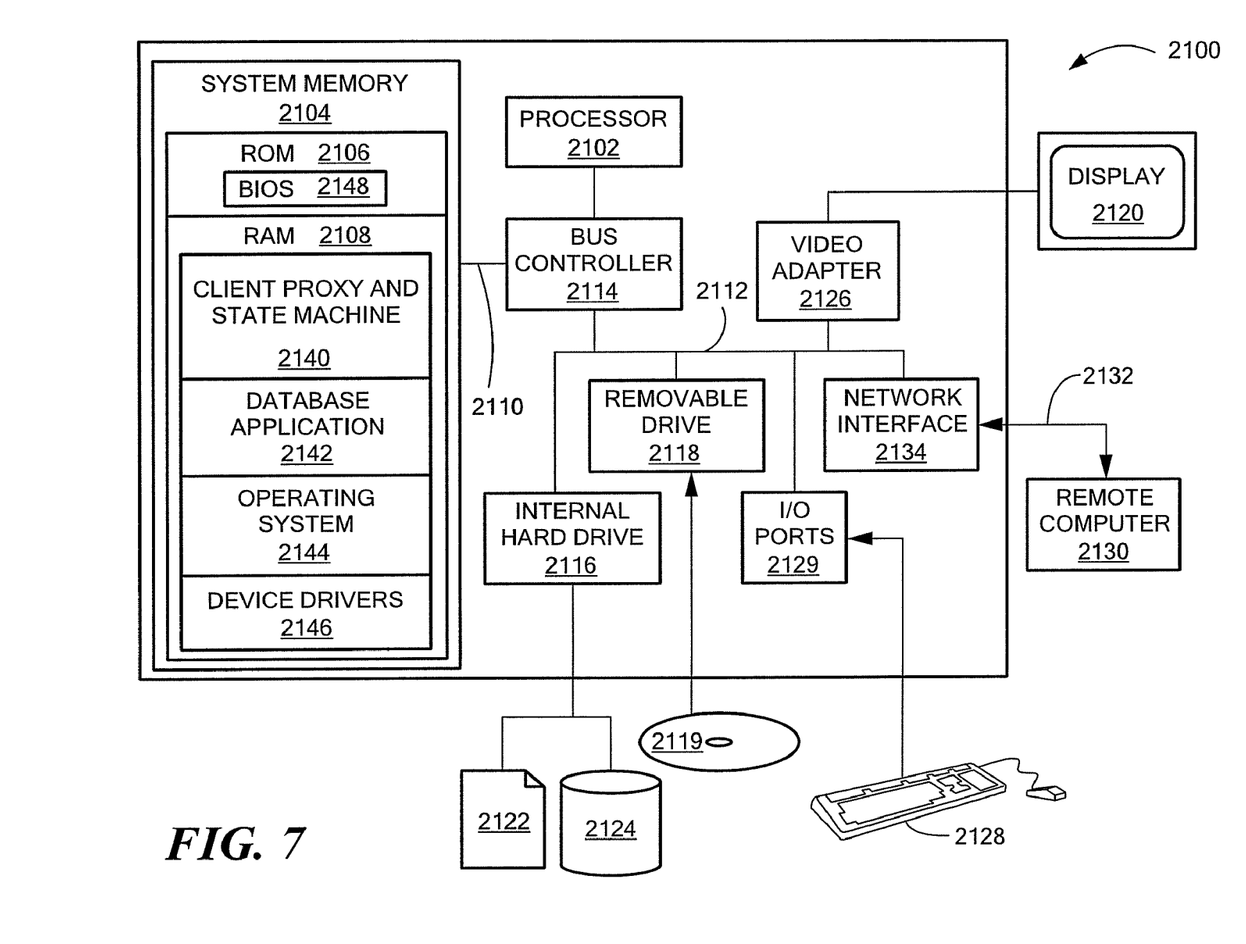
FIG. 7 is a diagram showing an exemplary hardware and operating environment of a suitable computer for use with embodiments of the invention.

FIG. 7 illustrates a computer 2100 suitable for supporting the operation of an embodiment of the systems, concepts, and techniques described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing systems and/or methods for maintaining stateful information for a client as described herein. In a further embodiment, the computer 2100 may execute various components of a system for maintaining stateful information for a client, as may be similar to system 100 described in conjunction with FIG. 1. For example, a first component includes a client proxy for collecting and storing client status information as may be similar to client proxy 104 described in conjunction with FIG. 1, and a second component includes a state machine for maintaining stateful information for the client as may be similar to state machine 102 described in conjunction with FIG. 1.

In still a further embodiment, the system implements the components on different processors, for example, a first processor and a second processor. For example, the first processor implements a client proxy, and the second processor implements a state machine. Advantageously, the division of processing function saves time and overhead and allows for asynchronous programming. For example, the client proxy requests and/or responds to client status information for a client while the state machine processes the status information, maintains stateful information for the client, and/or provides the stateful information to external services in response to a request for the information and/or automatically.

Furthermore, client status and/or stateful information may be saved in internal hard drive storage 2116, read-in from removable drive 2118, or received via the network 2132 from remote computer 2130, and loaded into RAM 2108. For example, client status information and/or stateful information may be loaded into RAM 2108. The data may be stored in a database format to execute in a database application or in a file format, which can include, but is not limited to, a comma-delimited text file.

In a further embodiment, the first and second processors may be respective processors of a dual-core processor. Alternatively, the first and second processor may respective first and second computing devices. Output of the first and/or second processors may be rendered on display 2120.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system for maintaining stateful information, comprising:
  a microprocessor;
  a plurality of clients comprising at least one stateful client and at least one stateless client;
  a client proxy configured to receive and collect status information associated with each client of the plurality of clients; and
  a state machine executing on the microprocessor and performing the following:
    receive the status information from the client proxy and store the received status information in a memory, the received status information associated with the at least one stateful client indicating that the at least one stateful client is unavailable due to interruption of service, wherein the interruption of service includes at least one of: a loss of a wireless messaging service and a loss of a geographic positioning service;
    provide to other clients engaged with the at least one stateful client constant connections to provide stateful information associated with the at least one stateful client when the at least one stateful client is unavailable due to the interruption of service to the at least one stateful client and to provide an indication that the at least one stateful client is still online despite the interruption of service and despite that the status information received from the client proxy indicates that the at least one stateful client is unavailable;
    provide to other clients engaged with the at least one stateless client stateful information associated with the at least one stateless client;
    receive updates from the other clients engaged with the at least one stateful client; and
    provide the updates to the at least one stateful client when the at least one stateful client becomes available.

2. The system of claim 1, wherein the client proxy includes a plurality of client proxies, each associated with a different client.

3. The system of claim 1, wherein the stateful information associated with the at least one stateful client and the stateful information associated with the at least one stateless client comprises:
 a unique client identifier; and
 a client status.

4. The system of claim 3, wherein the stateful information associated with the at least one stateful client and the stateful information associated with the at least one stateless client further comprises a client activity.

5. The system of claim 1, wherein the status information is controlled by at least one of the plurality of clients.

6. An apparatus for maintaining stateful information, comprising a non-transitory storage medium having stored instructions thereon that when executed by a machine result in the following:
 receiving status information from a client proxy and storing the received status information in a memory, the received status information associated with each client of a plurality of clients comprising at least one stateful client and at least one stateless client, the received status information associated with the at least one stateful client indicating that the at least one stateful client is unavailable due to interruption of service, wherein the interruption of service includes at least one of: a loss of a wireless messaging service and a loss of a geographic positioning service;
 providing to other clients engaged with the at least one stateful client constant connections to provide stateful information associated with the at least one stateful client when the at least one stateful client is unavailable due to the interruption of service to the at least one stateful client and to provide an indication that the at least one stateful client is still online despite the interruption of service and despite that the status information received from the client proxy indicates that the at least one stateful client is unavailable;
 providing to other clients engaged with the at least one stateless client stateful information associated with the at least one stateless client;
 receiving updates from the other clients engaged with the at least one stateful client; and
 providing the updates to the at least one stateful client when the at least one stateful client becomes available.

7. The article of claim 6, wherein the stateful information associated with the at least one stateful client and the stateful information associated with the at least one stateless client comprises:
 a unique client identifier; and
 a client status.

8. The article of claim 7, wherein the stateful information associated with the at least one stateful client and the stateful information associated with the at least one stateless client further comprises a client activity.

* * * * *